United States Patent
Saraiya et al.

(10) Patent No.: US 8,989,187 B2
(45) Date of Patent: Mar. 24, 2015

(54) METHOD AND SYSTEM OF SCALING A CLOUD COMPUTING NETWORK

(75) Inventors: Nakul Pratap Saraiya, Palo Alto, CA (US); Lawrence McGoff Matter, Millbrae, CA (US); Alok Rishi, Millbrae, CA (US)

(73) Assignee: Coraid, Inc., Redwood City, CA (US)

( * ) Notice: Subject to any disclaimer, the term of this patent is extended or adjusted under 35 U.S.C. 154(b) by 173 days.

(21) Appl. No.: 13/153,462

(22) Filed: Jun. 5, 2011

(65) Prior Publication Data

US 2011/0299537 A1 Dec. 8, 2011

Related U.S. Application Data

(60) Provisional application No. 61/351,701, filed on Jun. 4, 2010.

(51) Int. Cl.
*H04L 12/56* (2006.01)
*H04L 29/06* (2006.01)
*H04L 29/12* (2006.01)
*H04L 29/08* (2006.01)

(52) U.S. Cl.
CPC .......... *H04L 69/16* (2013.01); *H04L 61/2596* (2013.01); *H04L 61/6022* (2013.01); *H04L 69/22* (2013.01); *H04L 69/324* (2013.01)
USPC .......................................................... 370/392

(58) Field of Classification Search
CPC ................................................... H04L 61/2596
USPC ........................................ 370/392, 390, 389
See application file for complete search history.

(56) References Cited

U.S. PATENT DOCUMENTS

| 7,478,173 B1 * | 1/2009 | Delco ........................... 709/250 |
| 8,260,961 B1 * | 9/2012 | Wilkinson et al. ............. 709/245 |
| 2008/0162516 A1 * | 7/2008 | Shinomiya ..................... 707/100 |
| 2010/0107162 A1 * | 4/2010 | Edwards et al. ................... 718/1 |
| 2010/0257269 A1 * | 10/2010 | Clark ............................. 709/226 |
| 2011/0026403 A1 * | 2/2011 | Shao et al. ..................... 370/235 |
| 2011/0228778 A1 * | 9/2011 | Dyke et al. ..................... 370/392 |

* cited by examiner

*Primary Examiner* — Dang Ton
*Assistant Examiner* — Kevin Lee
(74) *Attorney, Agent, or Firm* — K&L Gates LLP

(57) ABSTRACT

Disclosed are a system, method, and article of manufacture of scaling a cloud computing network are disclosed. A virtual switch receives a data packet from a virtual machine. The virtual machine and the virtual switch can be implemented on the same host device. The virtual switch can remove the virtual MAC address from the data packet. The virtual switch can then include a physical MAC address or a synthetic MAC address of a target host. A synthetic MAC address can be utilized for multicast traffic where want to associate a separate MAC with each tenant of the host. The data packet can be sent to a target host.

15 Claims, 9 Drawing Sheets

RECEIVE A DATA PACKET WITH A VIRTUAL SWITCH FROM A REMOTE HOST, WHEREIN THE DATA PACKET COMPRISES A MAC ADDRESS OF A LOCAL HOST DEVICE OR A SYNTHETIC MAC ADDRESS OF A LOCAL HOST DEVICE AND AN INTERNET PROTOCOL ADDRESS OF A LOCAL VIRTUAL MACHINE
700

REMOVE THE MAC ADDRESS OF THE HOST DEVICE OR THE SYNTHETIC MAC ADDRESS OF A LOCAL HOST DEVICE FROM THE DATA PACKET
702

INCLUDE THE VIRTUAL MAC ADDRESS OF THE LOCAL VIRTUAL MACHINE IN THE DATA PACKET BY MATCHING WITH THE IP ADDRESS OF THE LOCAL VIRTUAL MACHINE
704

SEND THE DATA PACKET TO THE LOCAL VIRTUAL MACHINE
706

FIG. 7

METHOD AND SYSTEM OF SCALING A CLOUD COMPUTING NETWORK

CLAIM OF PRIORITY

This application claims the benefit of U.S. Provisional Application No. 61/351,701 filed Jun. 4, 2010. This provisional application is incorporated herein by reference.

FIELD OF TECHNOLOGY

This disclosure relates generally to a computer networking, and, more particularly, to a system, a method and an article of manufacture of scaling a cloud computing network.

BACKGROUND

A computer network may typically a collection of two or more computing nodes, which may be communicatively coupled via a transmission medium and utilized for transmitting information. Most computer networks may adhere to the layered approach provided by the open systems interconnect (OSI) reference model. The OSI reference may provide a seven (7) layer approach. This approach may include an application layer, (Layer 7), a presentation layer (layer 6), a session layer (Layer 5), a transport layer (Layer 4), a network layer (Layer 3), a data link layer (Layer 2) and a physical layer (Layer 1). Layer 7 through layer 5 inclusive may comprise upper layer protocols, while layer 4 through layer 1 may comprise lower layer protocols. Some computer networks may utilize only a subset of the 7 OSI layers. For example, the TCP/IP model, or Internet Reference model generally may utilize a 5 layer model. The TCP/IP model may comprise an application layer, (Layer 7), a transport layer (Layer 4), a network layer (Layer 3), a data link layer (Layer 2) and a physical layer (Layer 1). Each layer may include a set of responsibilities or services provided as well as typical systems and devices that provide those services. For example, a switch can be a Layer 2 device.

Increasingly, these systems and devices have been virtualized in cloud computing platforms to form virtualized components of a computer network that are connected to virtual machines that may also be resident in the cloud computing platform. Cloud computing may refer to the on-demand provisioning and use of computational resources (e.g. data, software and the like) via a computer network, rather than from a local computer. These 'virtualized networks' can be connected to virtual machines residing in one or more hosts. Such virtual machines may use virtual network interface cards (vNICs) to communicate over one or more virtualized networks. Consolidating virtualized network services into a cloud-computing platform may generate several issues such the scaling of system resources and/or isolation of the virtualized nodes (e.g. the virtual machines). For example, a cloud computing platform may assign a virtual machine one or more virtual network interfaces (vNICs) on three common types of networks—a 'public' network interface to communicate with an external network such as the Internet, a 'private' network interface to securely communicate with other virtual machines for the same 'tenant' organization or application, and/or a 'hybrid' network interface to communicate, for example, to fixed legacy infrastructure (e.g., legacy database servers or network storage devices). Notwithstanding the foregoing, there may also be additional types of virtualized and physical networks in a cloud computing platform. In the following discussions it should be understood that virtual machines and physical machines may commonly communicate using virtual network interfaces and physical network interfaces, respectively, and such interfaces are the source and destination of data packets communicated over networks.

It may be desired that these virtual interfaces provide complete isolation from a security perspective from other 'tenants' (e.g. other virtual machines) sharing the same physical infrastructure (e.g. physical hosts)in which the cloud computing platform resides. It may also be desired that these interfaces provide scalability, such that the Layer 2 switching infrastructure is not overwhelmed with broadcasts due to flooding for unknown MAC addresses and due to broadcast discovery protocols such as Address Resolution Protocol (ARP). For example, a scalability problem may occur since each virtual network interface (vNIC) is assigned a virtual media access control (virtual MAC or vMAC) address. As there may be many virtual machines per physical host, each with one or more vNICs, the resulting number of MAC addresses in the infrastructure can be an order of magnitude (or more) larger than would occur if there were no vNICs and vMACs. As a result, the number of broadcasts due to floods caused by limited capacity of switch forwarding tables used for MAC 'learning', and also due to address resolution protocol (ARP) request broadcasts, may increase by an order of magnitude (or more). This may dramatically increase the network bandwidth waste and the processor cycles wasted on hosts to filter out irrelevant traffic.

SUMMARY

A system, method, and article of manufacture of scaling a cloud computing network are disclosed.

In one aspect, a virtual switch receives a data packet from a virtual machine. The virtual machine and the virtual switch can be implemented on the same host device. The virtual switch can remove the source virtual MAC address from the data packet. The virtual switch can then include a physical MAC address or a synthetic MAC address as the source MAC address of the data packet. For example, a synthetic MAC address can be utilized where it may be desired to associate a separate MAC address with each tenant of the host. The data packet can be sent to a target host by transmitting to an intermediate physical switch as if it had been transmitted by a physical interface or a synthetic interface of the source host, and consequently eliminating the learning of the virtual MAC address in one or more intermediate physical switches while simultaneously enabling the learning of the source physical MAC address or source synthetic MAC address in one or more intermediate physical switches.

In another aspect, a data packet from a source virtual machine is obtained at a source virtual switch. The source virtual switch and the source virtual machine reside on the same source host. A virtual MAC address of a destination virtual machine in the data packet is rewritten to a physical MAC address or a synthetic MAC address of a destination host on which the destination virtual machine reside. The data packet can also include a Layer 3 IP address of the destination virtual machine. The data packet is transmitted to an intermediate physical switch on a computer network. The virtual MAC address of the destination virtual machine is not available to the first intermediate physical switch (or any subsequent intermediate physical switches between the source host and the destination host) while the physical MAC addresses or the synthetic MAC address of the destination host is available. The available address is used by the intermediate physical switches to forward the data packet to the destination physical host. The data packet is obtained at a destination virtual switch on the destination host. The destination virtual switch matches the IP address of the destination virtual machine with a virtual MAC address of the destination virtual machine. The physical MAC address or synthetic MAC address of the destination host included in the data packet is rewritten with the destination virtual MAC address of the destination virtual machine. The destination virtual switch can perform this step. The data packet can then be delivered to the destination virtual interface of the destination virtual machine with the correct destination virtual MAC address.

BRIEF DESCRIPTION OF THE DRAWINGS

The embodiments of this invention are illustrated by way of example and not limitation in the figures of the accompanying drawings, in which like references indicate similar elements and in which:

FIG. 7 illustrates an exemplary process for scaling a cloud-computing network, according to some embodiments.

Other features of the present embodiments will be apparent from the accompanying drawings and from the detailed description that follows.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

A. Environment and Architecture

Disclosed are a system, method, and article of manufacture of scaling a cloud computing network. Although the present embodiments have been described with reference to specific example embodiments, it will be evident that various modifications and changes may be made to these embodiments without departing from the broader spirit and scope of the various claims.

Figure 1:
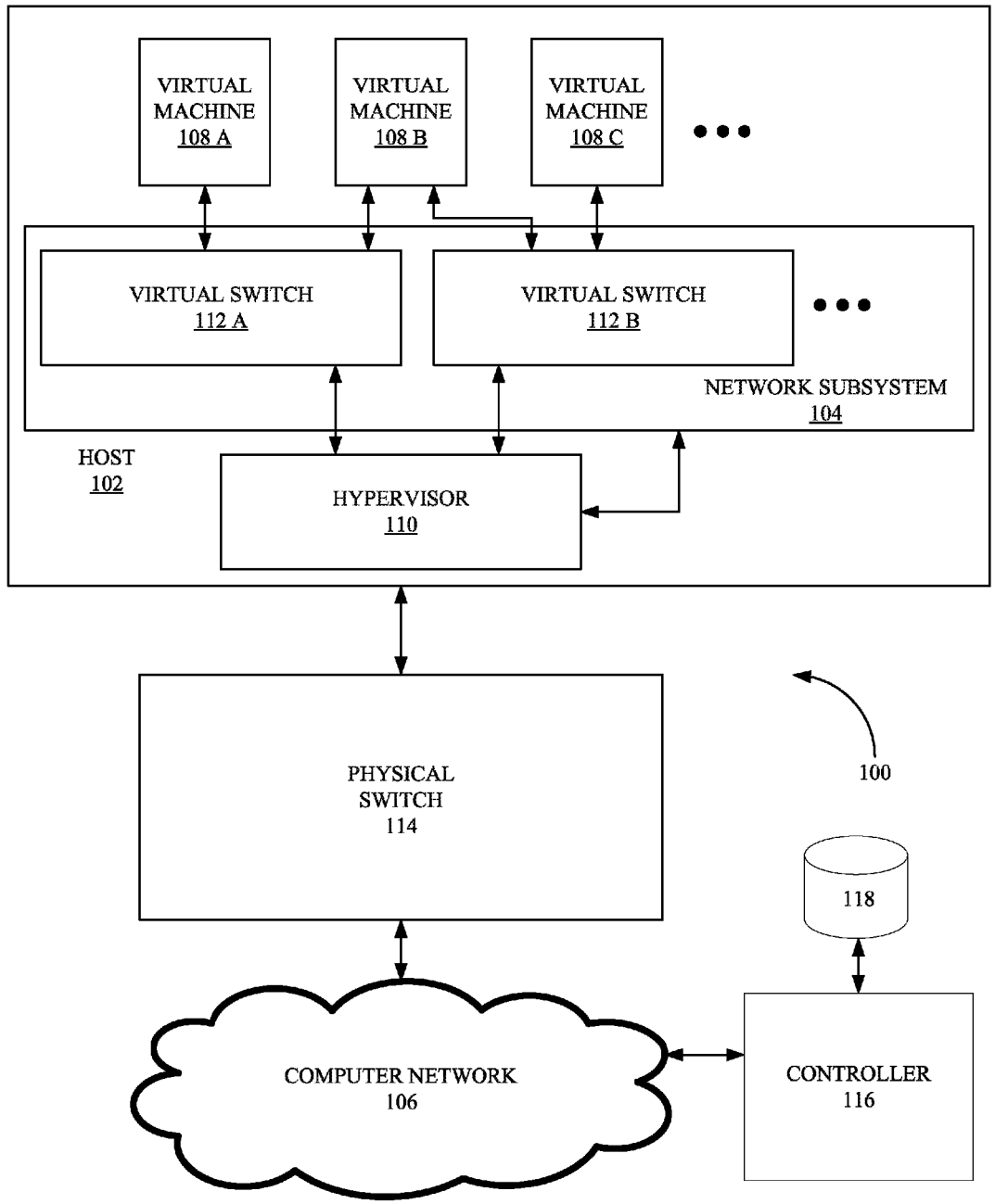
FIG. 1 shows, in a block diagram format, an example illustrating a system 100 of scaling a cloud computing network, according to one or more embodiments.
Figure 5:
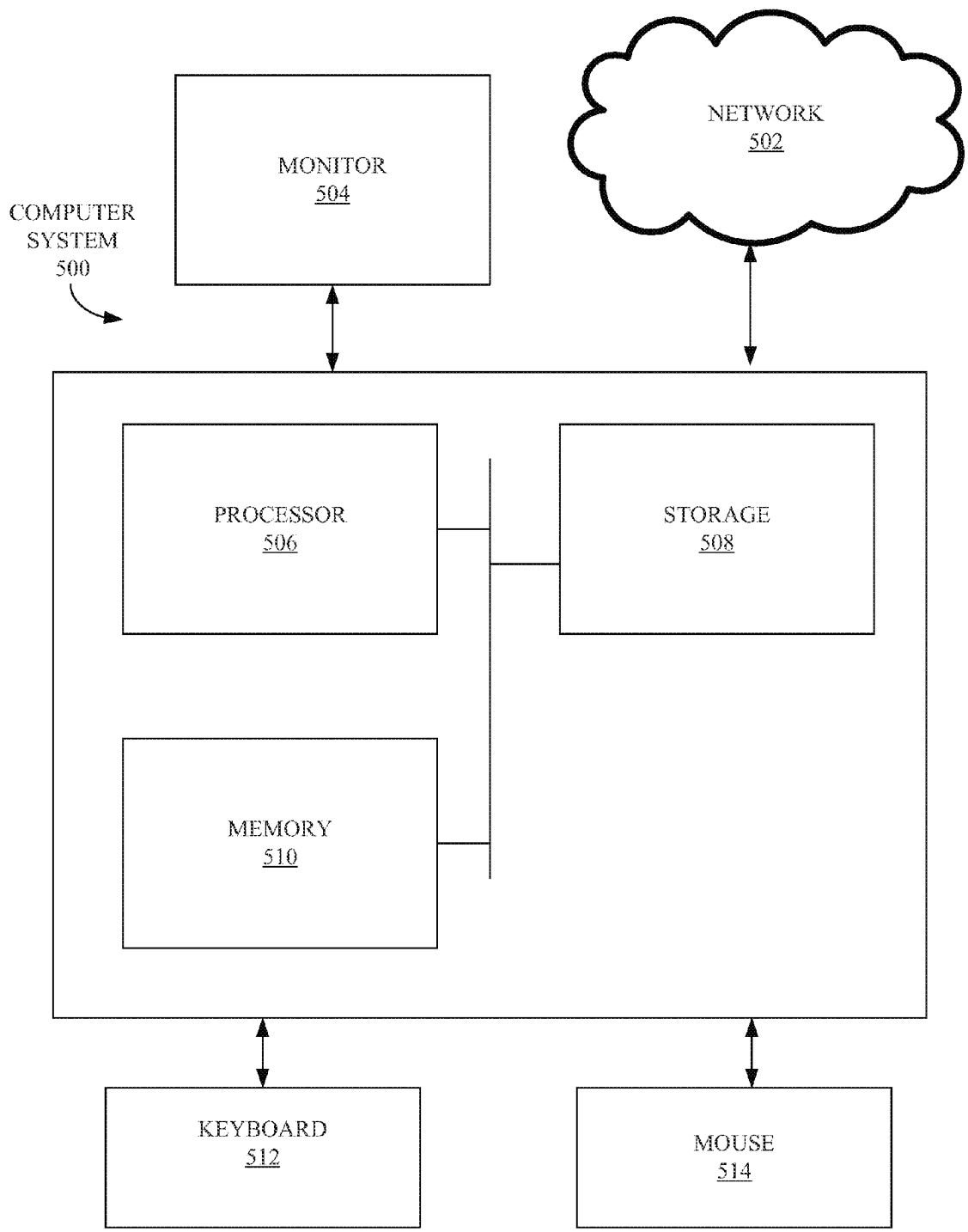
FIG. 5 depicts an example computer system used to implement some embodiments.

FIG. 1 shows, in a block diagram format, an example illustrating a system 100 of scaling a cloud computing network. FIG. 1 is a block diagram of an implementation of an example host system with one or more virtual machines, according to some embodiments. FIG. 1 includes a host 102. Host 102 can include a computing system (e.g. such as the computing system of FIG. 5 provided infra). For example, host 102 can be computer virtualization server hosting a hypervisor 110 (e.g. XenServer® 4or ESXi® 4 and the like). Host 102 can be configured to communicate with other computing machines via one or more computer networks such as computer network 106. In some embodiments, computer network 106 can be a local area network (LAN) utilizing Ethernet as the data link layer (Layer 2) protocol and Internet Protocol (IP), version 4 (IPv4) or version 6 (IPv6), as the network layer (Layer 3) protocol. In some embodiments, host 102 and its various components can be implemented and operate in a cloud-computing environment and can be operable to allocate physical and/or virtual resources for providing services over computer network 106.

Host 102 can include suitable logic, circuitry, interfaces, and/or code that can enable data processing and/or networking operations. For example, host 102 can include network subsystem 104. In various embodiments, network subsystem 104 can perform and/or control various the networking operations of host 102, such as, managing basic layer 2 switching (e.g. with the hypervisor 110 and virtual switch 112), virtual local area network (VLAN)-based switching (e.g. with the hypervisor 110 and virtual switch 112), layer 3 packet forwarding (routing), network address translation (NAT), IP checksum generation and other such operations. A network subsystem may consist of multiple components, including one or more virtual switches such as virtual switch 112, one or more virtual network interfaces such as that connecting virtual machine 108B to virtual switch 112A, one or more physical network interfaces (e.g. Ether et interfaces) such as that included on the host 102 and connecting to physical switch 114, and one or more 'control' components or processes that manage and control other components such as the aforementioned, among others.

Network subsystem 104 can support Layer 2 data packet switching and/or higher layer of data packet switching for communication between virtual machines in a host system (e.g. using hypervisor 110 and virtual switch 112 A-B) where the virtual machines use virtual network interface cards (vNICs). In various embodiments, the data packet switching supported by the network subsystem 104 need not be limited to layer 2 only, and can be any combination of layer 2 (with or without VLAN tagging), layer 3, layer 4, higher protocol layer and/or additional information including from the administrator as to how to perform the data packet switching. The combination of Layer 2 source and destination addresses, network layer protocol, Layer 3 source and destination addresses, Layer 4 protocol, source and destination ports, and other such data packet 'header information' may be referred to as a 'flow', and decisions, such as data packet switching decisions, that use one or more such components of a data packet as input to the decision-making, are referred to as 'flow-based' decisions. For example, network subsystem 104 can determine the correct address or combination of address information, such as, for example, an 802.1Q VLAN tag, a layer 3 address (e.g. an Internet Protocol version 4 (e.g. IPv4) address), a layer 4 transport protocol (e.g. Transmission Control Protocol (TCP)), one or both layer 4 transport protocol-specific port numbers, among others, to be used in order to select a destination virtual machine interface. In some embodiments, network subsystem 104 can include a processor, a memory, and 'N' ports for connecting to one or more computer networks, where N is an integer greater than or equal to one, as well as one or more physical network interface cards (NICs, pNICs) each with its own physical MAC address (pMAC). Network subsystem 104 can include a processor (not shown) that includes suitable logic, circuitry, interfaces, and/or code that can enable control and/or management of the data processing and/or networking operations in the network subsystem 104. In addition, network subsystem 104 can include a memory (not shown) that includes suitable logic, circuitry, and/or code that can enable storage of data utilized by network subsystem 104. Network subsystem 104 can be shared by a plurality of virtual machines 108 A-C.

Host 102 can support the operation of the virtual machines 108 A-C via hypervisor 110. In some embodiments, virtual machines 108 A-C can each correspond to an operating system (e.g. Windows® Server 2008 R2, Linux™, or similar), that can enable the running or execution of operations or services such as user applications, email server operations, database server operations, and/or web server operations, for example. Although, FIG. 1 illustrates three example virtual machines 108 A-C, it should be noted that the number of virtual machines that can be supported by the host 102 by utilizing the hypervisor 110 need not be limited to any specific number or to the particular example configuration shown in FIG. 1.

Host 102 can include a host processor (not shown) that can comprise suitable logic, circuitry, interfaces, and/or code that can be operable to control and/or manage data processing and/or networking operations associated with the Host 102. Host processor can be partitioned via, for example, time division multiplexing. For example, each virtual machine supported by host 102 can have a corresponding timeslot during which the host processor performs operations for that virtual machine. Moreover, in some embodiments, hypervisor 110 can have a corresponding timeslot. In addition, host 102 can include a host memory (not shown) that can comprise suitable logic, circuitry, and/or code that can enable storage of data utilized by host 102. The host memory can be partitioned into a plurality of memory portions. For example, each virtual machine supported by the host 102 can have a corresponding memory portion in the host memory. Moreover, the hypervisor 110 can have a corresponding memory portion in the host memory. In this regard, the hypervisor 110 and/or the virtual switches 112 A-B can enable data communication between virtual machines by controlling the transfer of data from a portion of the host memory that corresponds to one virtual machine to another portion of the host memory that corresponds to another virtual machine.

Hypervisor 110 and/or the virtual switches 112 A-B can operate as a software layer that can enable virtualization of hardware resources in the host 102 and/or virtualization of physical resources of one or more network devices as part of the network subsystem 104 on host 102. In some embodiments, virtual switches 112 A-B may be realized with some suitable hardware resources. Hypervisor 110 and/or the virtual switches 112 A-B can allocate hardware resources and can also enable data communication between the virtual machines 108 A-C and hardware resources in one or more network devices as part of the network subsystem 104 on host 102. For example, hypervisor 110 and/or virtual switches 112 A-B can manage communication between the virtual machines 108 A-C and the ports of network subsystem 110. Generally, hypervisor 110 (also called virtual machine manager) can implement hardware virtualization techniques that allow multiple operating systems (e.g. guests) to run concurrently on host 102. Hypervisor 110 can present to the guest operating systems a virtual operating platform and manages the execution of the guest operating systems. Multiple instances of a variety of operating systems may then share the virtualized hardware resources.

Generally, a virtual switch (such as virtual switches 112 A-B) can provide network connectivity within a virtual environment such that virtual machines 108 A-C and their applications can communicate within a virtual network (such as a virtual network internal to host 102, and the like) as well as in a 'physical' (i.e. non-virtual) network (such as computer network 106), as well as virtual networks that may span multiple hosts over utilizing one or more physical networks between them. Virtual switches 112 A-B can include suitable logic, virtual circuitry, interfaces, and/or code that can enable many of the same functionalities as a physical switch (e.g. a modern Ethernet switch) in addition to other functions such as those describe herein. Virtual switches 112 A-B can operate at the data link layer of the OSI model. For example, virtual switches 112 A-B can be a layer 2 forwarding engine for Ethernet data packets. In addition, virtual switches 112 A-B can include other functionalities such as Layer 2 security, checksum, VLAN tagging, stripping, and filtering units. Virtual switches 112 A-B can be programmable (e.g. by a remote controller communicatively coupled with host 102 via a TCP connection). Virtual switches 112 A-B can include functionality for examining the packet headers of data packets. For example virtual switches 112 A-B can maintain a MAC-port forwarding table. Upon egress of a data packet from a particular virtual machine, such as virtual machine 108 A for example, virtual switch (112 A) can examine the data packet. If the data packet is for another virtual machine in the virtual network (e.g. another virtual machine in the same subnet as virtual machine 108 A) such as virtual machine 108 B, then virtual switch 112 A can forward the data packet to virtual machine 108 B. For example, virtual switch 112 A can look up the data packet's destination virtual MAC address when it arrives and then forwards a frame to one or more ports for transmission. Virtual switches 112 A-B can include access control lists (ACLs) or sets of rules to permit data packets to be filtered (accepted or dropped) and/or forwarded according to policy. An ACL rule can generally be configured to control either inbound or outbound traffic of the virtual switches 112 A-B. For example, an ACL list can include rules that make use of the MAC and IP address information (and concomitant switch port numbers) of virtual machines 108 A-B. Additionally virtual switches 112 A-B can include a further functionality for modifying the packet headers of data packets. In some embodiments, virtual switches 112 A-B can also include and manage 'flow-based', (as discussed supra), ACLs to examine and then modify data packet headers to achieve desired data packet forwarding behavior. Whenever a data packet from a virtual network interface card (vNIC) (thus, with a virtual MAC (vMAC) source address) from virtual machines 108 A-C seeks to egress the host 102 over a physical network interface (pNIC), the source vMAC address information in the data packet header can be rewritten to the pMAC address of host 102 (e.g. a pMAC of a physical NIC of host 102). Accordingly, from a perspective of the external physical Layer 2 switching infrastructure, the data packet appears to originate from a pMAC address of host 102. The vMAC addresses of virtual machines 108 A-C can behidden from physical switch 114. According to another embodiment, a synthetic host MAC address can be used rather than the pMAC address of host 102 in order to permit, for example host-based failover or assignment of per-tenant MAC addresses per host. Additionally, virtual switches 112 A-B can include a further functionality for additionally examining and modifying the packet data (payload) of data packets. For example, a virtual switch may include protocol-specific functionality for Address Resolution Protocol (ARP) utilizing this functionality. Generally, an ARP protocol can be a computer networking protocol for determining a network host Link Layer or hardware address when the Internet Layer (IP) or Network Layer address is known. ARP can typically be a 'low level' request and answer protocol communicated on the media access level of the underlying network. A virtual switch may include ACL rules to convert an ARP request broadcast data packet to an ARP reply unicast packet, wherein the destination MAC address of the resulting data packet is a virtual MAC address of the original requestor, the source MAC address is a virtual MAC address (vMAC) or physical MAC address (pMAC) corresponding to the IP address in the ARP request, and the data packet payload includes a sender protocol address (SPA) with the target IP address included in the original ARP request, a sender hardware address (SHA) with the vMAC or pMAC corresponding to the included SRA, a target protocol address (TPA) with the source IP address in the original ARP request, and a target hardware address (THA) with the vMAC address of the requestor the original ARP request. Such a reply packet may then be delivered to the original source virtual machine interface in response to the original ARP request.

When a data packet ingresses host 102 over a pNIC, virtual switches 112 A-C can use flow-based ACL rules to match the destination FP address of the target virtual machine to the target virtual machine's vNIC (and concomitant switch port number). Virtual switches 112 A-C can then rewrite the pMAC address to the appropriate vMAC address and deliver the data packet over the appropriate switch port of the virtual switch corresponding to the destination vNIC. Thus, the flow-based ACL technique uses LP addresses to perform data packet switching while rewriting data packet MAC addresses, not IP addresses.

In some embodiments, virtual switches 112 A-B can also include ACL rules for data packets sent between virtual machines 108 A-C. For example, virtual machine 108 A can send a data packet addressed to virtual machine 108 B. Virtual switch 112 A can determine that the target virtual machine 108 B is located in the same host and on the same virtual switch as the sending virtual machine 108 A. Virtual switch 112 A can then forward the data packet to virtual machine 108 B without rewriting the virtual MAC addresses of the sender or receiver.

Virtual switches 112 A-B can be programmed to avoid unnecessary or undesired (e.g. in order to maintain isolation between virtual interfaces or virtual machines) deliveries of broadcast data packets. For example, virtual switches 112 A-B can examine an incoming data packet's header and/or payload to determine if the data packet is part of an address resolution protocol (ARP) broadcast from a virtual machine such as virtual machine 108 A. Generally, an ARP protocol can be a computer networking protocol for determining a network host's Link Layer or hardware address when the Internet Layer (IP) or Network Layer address is known. ARP can typically be a 'low level' request and answer protocol communicated on the media access level of the underlying network. Virtual switches 112 A-B can include a functionality that forwards the data packets of detected ARP broadcast to controller 116. Controller 116 can include a database 118 that it chides the IP addresses and virtual MAC addresses of the virtual machines 108 A-C. Controller 116 can then provide a response (e.g. construct a data packet with the correct ARP reply) to virtual machine 108 A that initiated the ARP broadcast. In another embodiment, controller 116 may include ACL rules on virtual switches 112 A-B to convert ARP request broadcast data packets to an ARP reply unicast packets, wherein the destination MAC address of the resulting data packets is a virtual MAC address of the original requestor, the source MAC address is a virtual MAC address (vMAC) or physical MAC address (pMAC) corresponding to the IP address in the ARP request, and the data packet payload includes a sender protocol address (SPA) with the target IP address included in the original ARP request, a sender hardware address (SHA) with the vMAC or pMAC corresponding to the included SPA, a target protocol address (TPA) with the source IP address in the original ARP request, and a target hardware address (THA) with the vMAC address of the requestor in the original ARP request. Such a reply packet may then be delivered to the original source virtual machine interface in response to the original ARP request.

In one example, one or more ARP proxy agents can be provided by controller 116. Controller 116 can update the ARP proxy agents virtual machines are allocated or deallocated from host 102. ARP proxy agents can be implemented in several possible formats. For example, an ARP proxy agent can be implemented on host 102. The ARP agent can communicate with controller 116 over a secure channel. The virtual machine can include a hidden promiscuous interface on virtual switches 112 A-B such that it is able to receive (and transmit) data packets with any destination MAC (and source MAC) address. Layer 2 switch MAC learning can also be optionally disabled on the virtual switch port concomitant to this interface.

In another example, the ARP proxy agent can be implemented as a daemon process in the control domain (e.g. dom0) on each hypervisor (e.g. hypervisor 110). This example can include a hidden 'tap' interface on virtual switches 112 A-B such that it is able to receive (and transmit) data packets with any destination (and source) MAC address. Layer 2 switch MAC learning may also be optionally disabled on the virtual switch port concomitant to this interface.

In still another example, the ARP proxy agent can be implemented as one or more external ARP virtual machines or processes that are connected to each virtual switch 112 A-B (or, in some cases, subsets of a plurality of virtual switches) in the cloud via virtual switch tunnel interfaces, such as generic routing encapsulation (GRE) tunnels. In this example, virtual switches 112 A-B can be implemented on a cloud computing platform. On each virtual switch 112 A-B in the cloud, flow-based ACLs can direct ARP requests to a suitable ARP virtual machine. The ARP virtual machine can then respond with the appropriate vMAC address (e.g. if the target IP address is on the same virtual switch) or pMAC address (e.g. if the target IP address is on a different physical host). In another example embodiment, a synthetic MAC address can be utilized in place of the pMAC address. (It should be noted that in the other example embodiments noted supra the ARP virtual machine and/or a similar entity appropriate to the example embodiment can perform this operation as well). In each of these examples, it is noted that operations such as anti-spoofing and isolation enforced by access control list (ACL) rules can be applied, as well, in order to ensure that the data traffic is legal according to the particular isolation policies of the network.

In some embodiments, virtual switches 112 A-B can determine if an ARP broadcast originated locally (e.g. from a virtual machine 108 A-C and/or another virtual machine implemented in host 102). If the ARP broadcast did not originate locally, virtual switches 112 A-B can include rules not to forward data packets that are a part of the non-local ARP broadcast unless, for example, the ARP broadcast is to discover an IP address corresponding to a local virtual machine e.g. for a virtual machine 108 A-C), in which case such a broadcast may be permitted and delivered.

It should be noted that host 102 can also include other functionalities and components (e.g. various network interface devices and ports not described herein, I/O devices, security protocols, etc.) that will be known to one of ordinary skill in the art and that are not shown in order to simplify the description of the embodiments provided herein.

Controller 116 can manage virtual switches 112 A-B (e.g. via the OpenFlow protocol 304 using a secure channel 306). Controller 116 can maintain a list of all the IP addresses of the virtual machines located on a host. This list can be stored in database 118. For example, controller 116 can have an a priori knowledge of each virtual machines 108 A-C virtual network interfaces, and the assignment of vNICs to pNICs on each host because it is the one assigning virtual machines 108 A-C to hosts (such as host 102). Controller 116 can also have a priori knowledge of the IP addresses and subnet masks for virtual machine's 108 A-C respective vMAC address and/or pMAC addresses. Controller 116 can maintain a list of this information. Accordingly, controller 116 can construct a database of each host, the virtual machines running in the host, the vMAC address of each virtual machine, as well as the IP address and subnet mask of each virtual machine, each virtual switch port and/or each virtual switch uplink ports MAC address used to communicate with physical infrastructure. Controller 116 can include functionality for constructing responses to ARP requests using the list of IP addresses. In some embodiments, controller 116 and/or database 118 can be implemented in a cloud-based platform. In an example embodiment, controller 116 can be a cloud-control plane.

Figure 2:
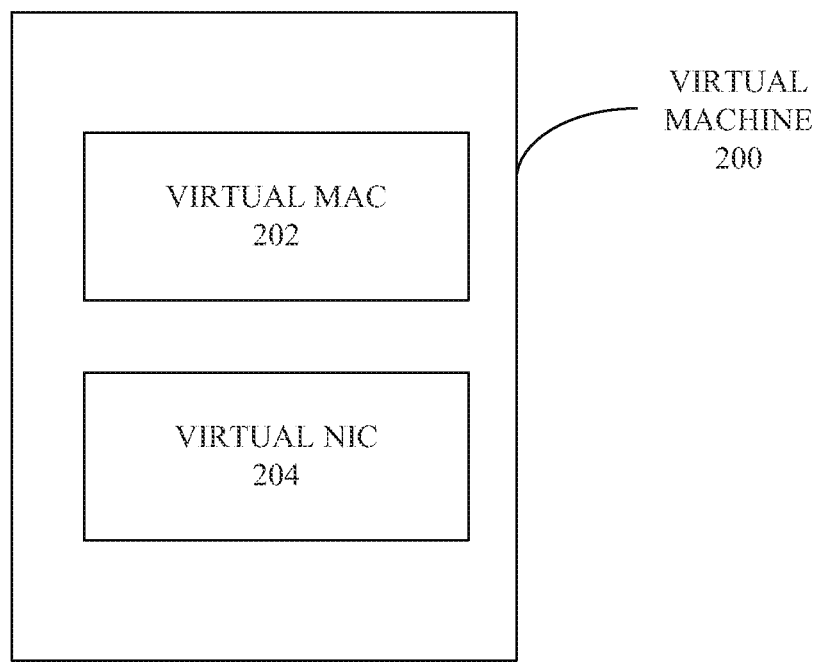
FIG. 2 depicts in block format an example virtual machine 200, according to an example embodiment.

FIG. 2 depicts in block format an example virtual machine 200, according to an example embodiment. Virtual machine 200 can be a software implementation of a machine (i.e. a computer) that executes programs like a physical machine. Virtual machine 200 can be implemented by either software emulation or hardware virtualization. Virtual machine 200 can be communicatively coupled with a virtual computer network and/or a physical computer network (via its host). Components of virtual machine 200 can also be virtualized. For example, virtual machine 200 can include, inter alia, virtualized networking components such as a virtual NIC 204. Virtual NIC 204 can be assigned the virtual MAC address 202 upon creation of virtual machine 200. Virtual MAC 202 can be an address, such as an Ethernet address, that is part of the MAC layer (e.g. in layer 2). Virtual NIC 204 (e.g. a virtualized network adapter) can be a virtualized implementation of a NIC that connects virtual machine 200 to a virtual computer network (e.g. via a virtual switch).

Figure 3:
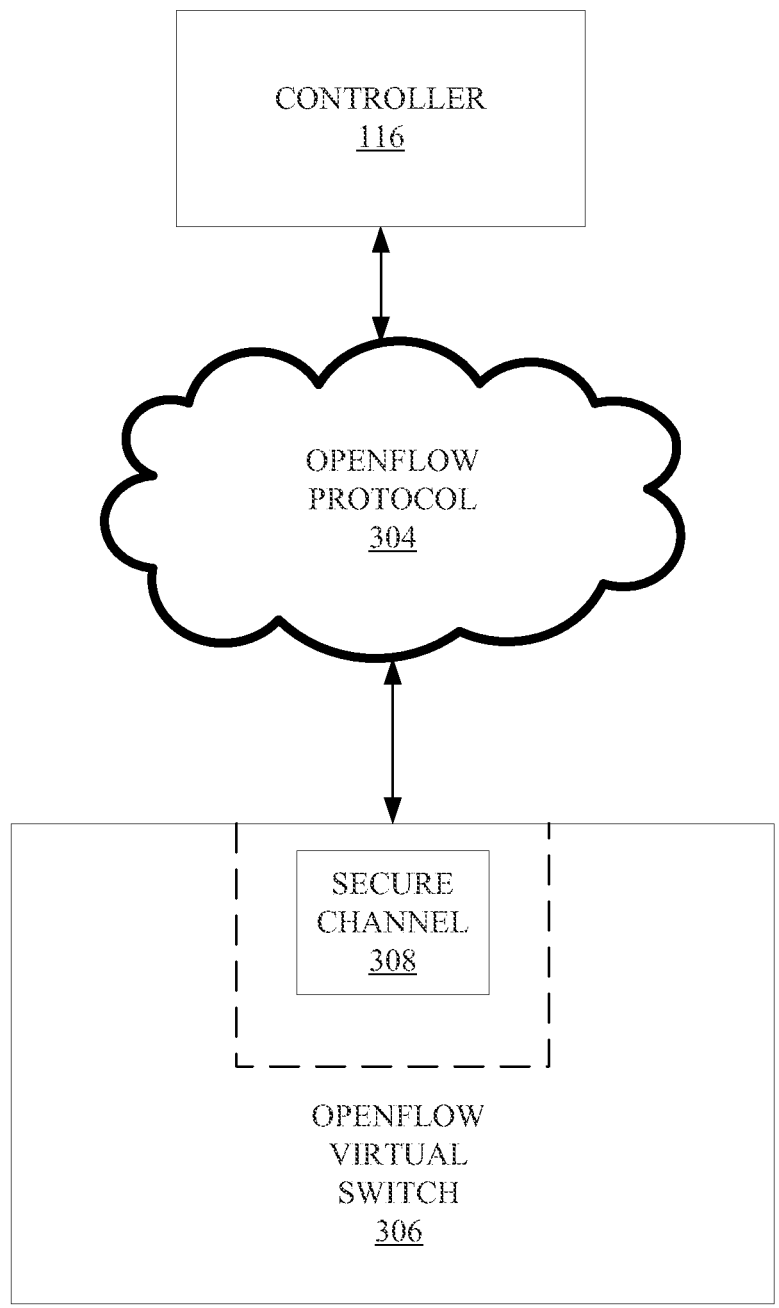
FIG. 3 depicts an example OpenFlow® network, according one or more embodiments.

FIG. 3 depicts an example OpenFlow® network, according one or more embodiments. OpenFlow® is a communications protocol that gives access to the forwarding plane of a switch and/or router over the network (see www.openflow.org). In some embodiments, OpenFlow® controller 302 can manage virtual switch 306 using OpenFlow® protocol 304 via a secure channel 308. Examples of OpenFlow® controllers include Reference Learning Switch Controller, NOX controller, Beacon controller, Helios controller, BigSwitch controller, SNAC controller, Maestro controller and the like. Additionally, in some embodiments, OpenFlow® virtual switch 306 can be an Open vSwitch such as described at www.open-vswitch.org and/or similar types of virtual switches. Virtual switch 306 can include rules to enable the rewriting of the information in data packets from a source virtual machine to a destination host. For example, virtual switch 306 can rewrite a virtual MAC address of a data packet upon egress of the data packet from a virtual machine in a particular VLAN and/or subnet. Virtual switch 306 can include rules to rewrite the virtual MAC address as a physical and/or synthetic MAC address. Upon ingress of a data packet including the physical and/or synthetic MAC address, virtual switch 308 can look up the IP address of the virtual machine, match the IP address to the original virtual MAC address that was written over and then rewrite the data packet to replace the physical and/or synthetic MAC address with the original virtual MAC address. In some embodiments, the systems, protocols and operations of FIG. 3 can be used to implement system 100 of FIG. 1.

Figure 4:
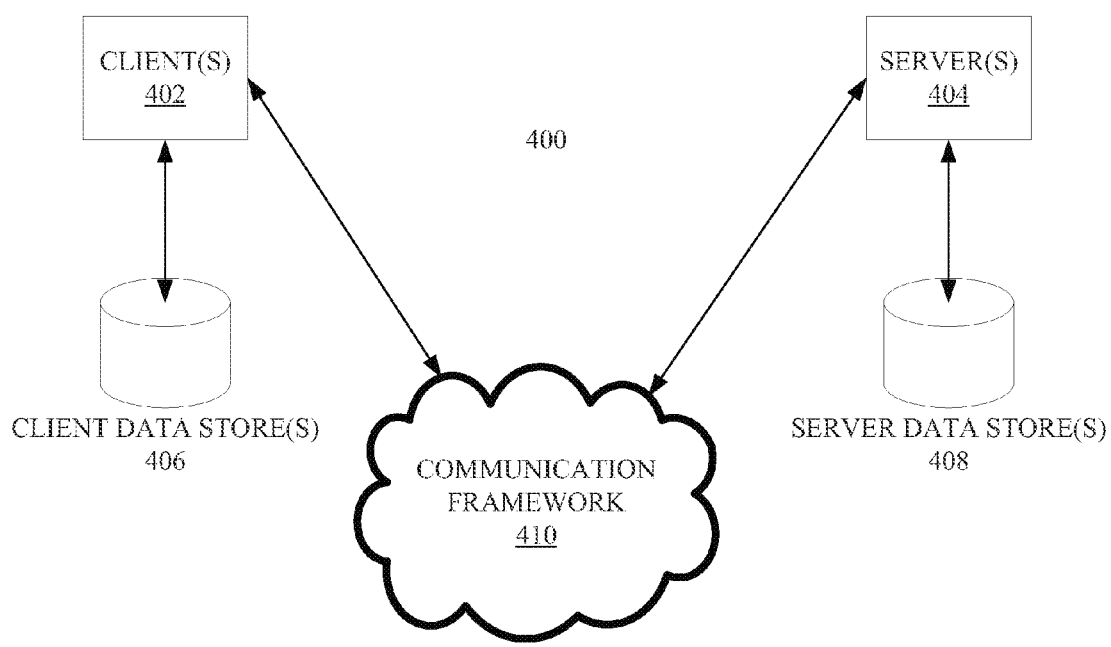
FIG. 4 is another block diagram of a sample computing environment 400 with which embodiments can interact.

FIG. 4 is another block diagram of a sample computing environment 400 with which embodiments can interact. The system 400 further illustrates a system that includes one or more client(s) 402. The client(s) 402 can be hardware and/or software (e.g., threads, processes, computing devices). The system 400 can also include one or more server(s) 404. The server(s) 404 can also be hardware and/or software (e.g., threads, processes, computing devices). One possible communication between a client 402 and a server 404 may be in the form of a data packet adapted to be transmitted between two or more computer processes. The system 400 can include a communication framework 410 that can be employed to facilitate communications between the client(s) 402 and the server(s) 404. The client(s) 402 can be connected to one or more client data store(s) 406 that can be employed to store information local to the client(s) 402. Similarly, the server(s) 404 can be connected to one or more server data store(s) 408 that can be employed to store information local to the server(s) 404. System 400 can be utilized to implement various embodiments of the system 100 of FIG. 1 and/or system 300 of FIG. 3.

Various embodiments of the invention may be implemented on virtually any type of computer regardless of the platform being used. For example, as shown in FIG. 5, a computer system 500 includes one or more processors 506, associated memory 510 (e.g., random access memory (RAM), cache memory, flash memory, etc.), a storage device 508 (e.g., a hard disk, an optical drive such as a compact disk drive or digital video disk (DVD) drive, a flash memory stick, etc.), and numerous other elements and functionalities typical of today's computers (not shown). The computer 500 may also include input means, such as a keyboard 512, a mouse 514, or types of user input devices. Further, the computer 500 may include output means, such as a monitor 504 (e.g., a liquid crystal display (LCD), a plasma display, or cathode ray tube (CRT) monitor). The computer system 500 may be connected to a network 502 (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. In some embodiments, the computer system 500 can include at least the minimal processing, input, and/or output means necessary to practice the various embodiments. In some embodiments, the computing system 500 can be a server operating in a cloud computing platform e.g. an OpenFlow® server).

B. Operation Overview

Figure 6:
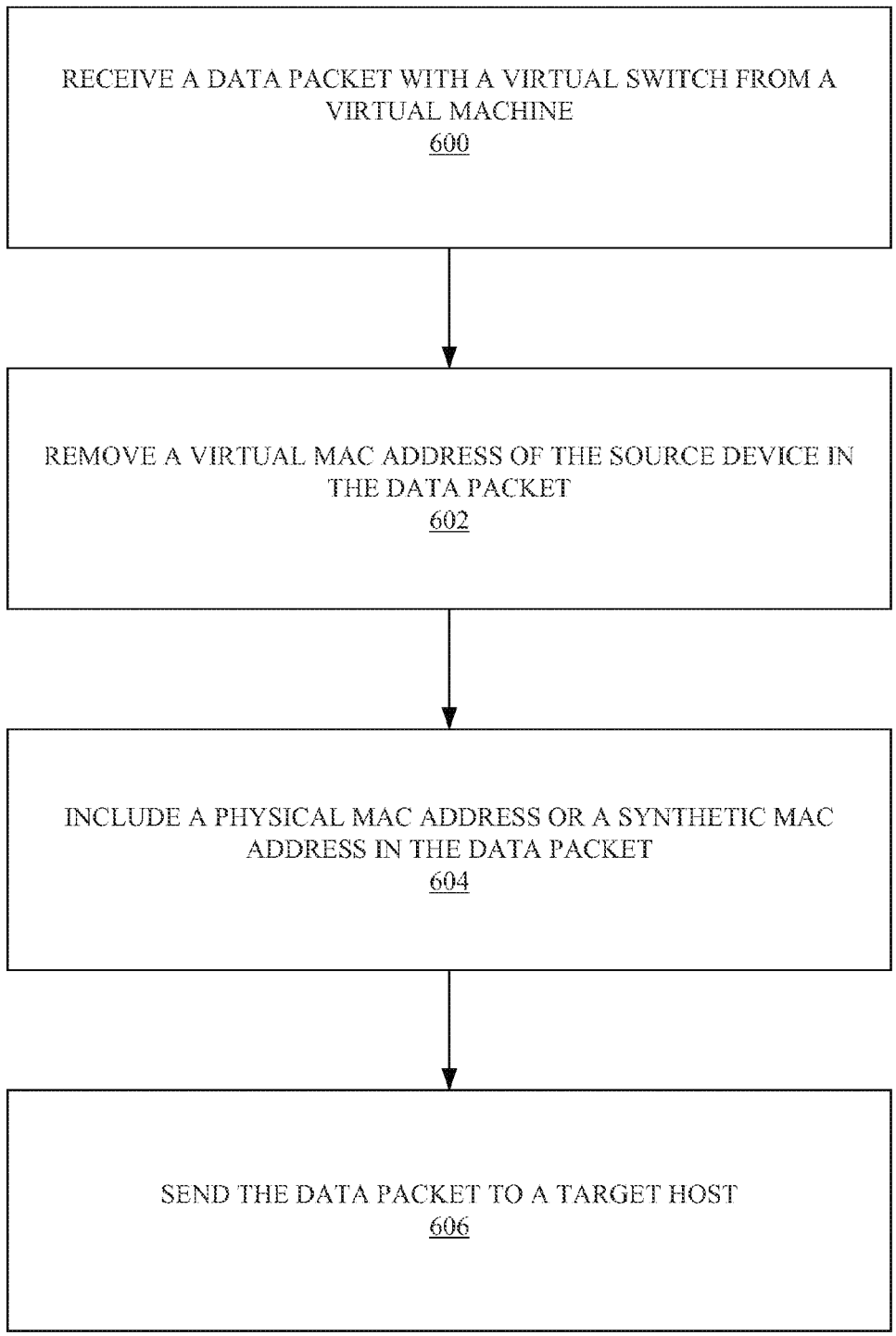
FIG. 6 illustrates an exemplary process for scaling a cloud computing network, according to some embodiments.
Figure 8A:
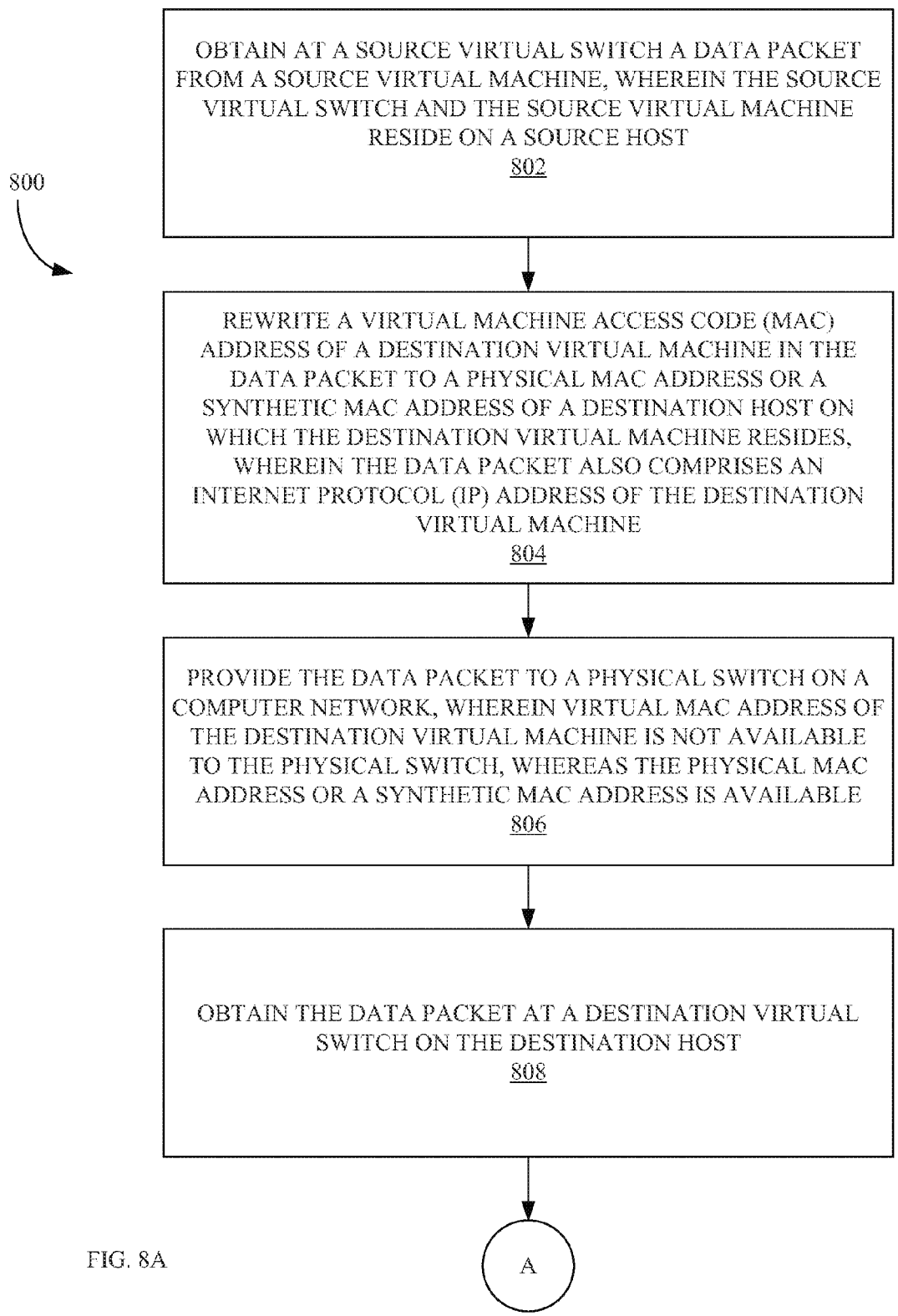
FIGS. 8 A-B illustrates another exemplary process for scaling a cloud-computing network, according to some embodiments.
Figure 8B:
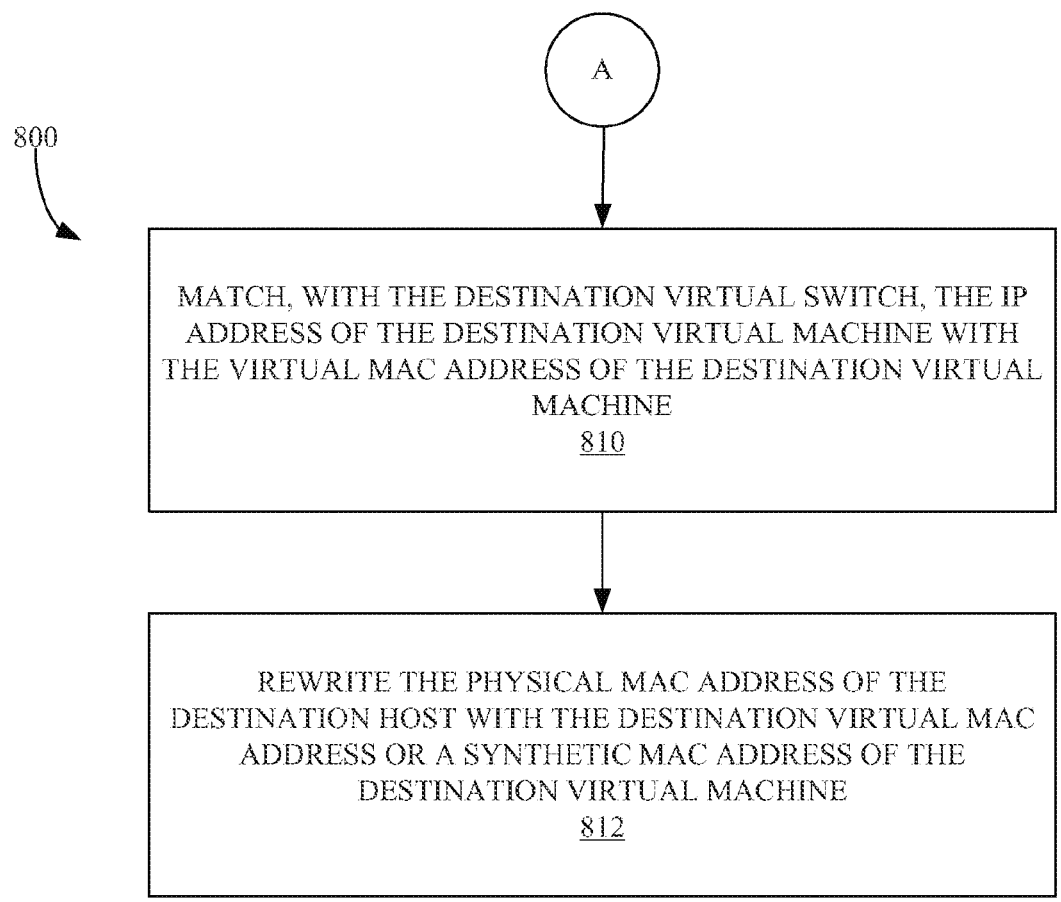

Regarding FIGS. 6-8, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with some embodiments, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with some embodiments.

FIG. 6 illustrates an exemplary process for scaling a cloud computing network, according some embodiments. In step 600, a virtual switch receives a data packet from a virtual machine. For example, the virtual machine and the virtual switch can be implemented on the same host device. In step 602, the virtual switch can remove the virtual MAC address from the data packet. In step 604, the virtual switch can then include a physical MAC address (e.g. the MAC address of a physical network interface on the host in which the virtual switch resides) or a synthetic MAC address. For example, a synthetic MAC address can be utilized where it may be desired to associate a separate MAC with each tenant of the host. In step 606, the data packet can be sent to a target host. In various example embodiments, the systems and operations of FIGS. 1-5 can be used to implement the steps of FIG. 6.

FIG. 7 illustrates an exemplary process for scaling a cloud-computing network, according to some embodiments. In some embodiments, FIG. 7 can be a continuation of the steps of FIG. 6. In step 700, a virtual switch can receive a data packet from a remote host. The data packet can include a physical MAC address of the local host or a synthetic MAC address of the local host. The data packet can also include the IP address of a target virtual machine. In step 702, the virtual switch can remove the physical MAC address of the local host or the synthetic MAC address of the local host. In step 704, the virtual switch can include the virtual MAC address of the target virtual machine by matching the destination IP address in the data packet with an IP address of the target virtual machine. In step 706, the data packet is sent to the target virtual machine. In various example embodiments, the systems and operations of FIGS. 1-5 can be used to implement the steps of FIG. 7.

FIG. 8 illustrates an exemplary process for scaling a cloud-computing network, according to some embodiments. In step 802 of process 800, a data packet from a source virtual machine, is obtained at a source virtual switch. The source virtual switch and the source virtual machine reside on the same source host. In step 804, a virtual MAC address of a destination virtual machine in the data packet is rewritten to a physical MAC address or a synthetic MAC address of a destination host on which the destination virtual machine resides. The data packet can also can include a destination IP address of the destination virtual machine. In step 806, the data packet is transmitted to a physical switch on a computer network. The virtual MAC address of the destination virtual machine is not available to the physical switch for data forwarding, whereas the physical MAC address or a synthetic MAC address of the destination host is available for data packet forwarding. In step 808, the data packet is obtained at a destination virtual switch on the destination host, after it has been forwarded by one or more intermediate physical switches. In step 810, the destination virtual switch matches the IP address of the destination virtual machine with the virtual MAC address of the destination virtual machine. In step 812, the physical MAC address or the synthetic MAC address of the destination host is rewritten with the destination virtual MAC address of the destination virtual machine. The destination virtual switch can perform this step. In some example embodiments, the systems and elements of FIGS. 1-5 can be utilized with various modifications to implement the steps of FIGS. 8 A-B.

D. Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computer-implemented method comprising:
receiving, with a virtual switch associated with a first subnet of a local host device, a first data packet from a virtual machine within the first subnet managed by a hypervisor and implemented in the local host device, the virtual machine also being communicatively coupled to a second virtual switch associated with a second subnet and configured to transmit the first data packet to the virtual switch conditioned on determining a destination of the first data packet is not associated with the second subnet;
conditioned on determining the destination of the first data packet is outside of the first subnet, removing, with the virtual switch of the local host device, a virtual media access control (MAC) address of the virtual machine in the first data packet;
including, with the virtual switch of the local host device, a physical MAC address of the local host device in the first data packet in place of the virtual MAC address of the virtual machine; and
responsive to including the physical MAC address of the local host device in the first data packet in place of the virtual MAC address of the virtual machine, sending the first data packet to a remote host device in a computer network.

2. The method of claim 1, further comprising:
receiving a second data packet from the remote host device, wherein the second data packet comprises the physical MAC address of the local host device and an internet protocol address of the virtual machine.

3. The method of claim 2 further comprising:
determining the internet protocol address in the second data packet; and
matching the internet protocol address with the virtual MAC address of the virtual machine.

4. The method of claim 3 further comprising:
replacing the physical MAC address of the local host device in the second data packet with the virtual MAC address of the virtual machine.

5. The method of claim 4 further comprising:
sending the second data packet to the virtual machine.

6. The method of claim 4:
wherein the virtual switch comprises a network switch implemented on the local host device.

7. The method of claim 4 further comprising:
detecting, with the virtual switch, an address resolution protocol (ARP) broadcast data packet from the virtual machine; and
forwarding the ARP broadcast data packet to a remote server via a secure communication protocol.

8. The method of claim 7 further comprising:
generating a list of virtual machines implemented in the local host device, the list comprising of a set of corresponding MAC addresses and a set of corresponding internet protocol addresses of each of the virtual machines implemented in the local host device, and a set of corresponding MAC addresses of the local host device for each of the virtual machines implemented in the local host device; and
constructing a response to the ARP broadcast data packet using the list of virtual machines.

9. A non-transitory computer readable medium comprising computer executable instructions configured to perform the method of claim 1.

10. A system comprising:
a physical switch communicatively coupled with a computer network;
a first host device comprising a computing device, wherein the first host device is communicatively coupled with the physical switch;
a first virtual machine, wherein the first virtual machine is implemented in the first host device, wherein the first virtual machine has a virtual media access control (MAC) address and an internet protocol address;
a virtual switch implemented in the first host device and communicatively coupled with the first virtual machine, wherein the virtual switch replaces the virtual MAC address of the first virtual machine with a physical MAC address of the first host device in a data packet upon egress of the data packet, and wherein upon ingress of another data packet with the internet protocol address of the first virtual machine and the physical MAC address of the first host device, the virtual switch replaces the physical MAC address of the first host device with the virtual MAC address of the first virtual machine and forwards the another data packet to the first virtual machine;
a control server configured to generate a list of all virtual machines in a subnet of which the first virtual machine is a member and construct a response to an address resolution protocol (ARP) broadcast using the list; and
a hypervisor implemented in the first host device, wherein the hypervisor manages implementation of the first virtual machine and the virtual switch in the first host device,
wherein the virtual switch is configured to refrain from communicating the ARP broadcast to any of the virtual machines implemented in the subnet conditioned on the ARP broadcast being transmitted by the first virtual machine of the same subnet.

11. The system of claim 10 further comprising:
a second virtual machine implemented in the first host device, and wherein if the data packet is addressed to the second virtual machine, the virtual switch does not replace the virtual MAC address of the first virtual machine with the physical MAC address of the first host device in the data packet.

12. The system of claim 10, wherein the list comprises a set of virtual MAC addresses and a set of internet protocol addresses of each virtual machine in the list and a corresponding set of MAC addresses of each host for each virtual machine in the list; and
wherein the virtual switch communicates the ARP broadcast to the control server.

13. The system of claim 12:
wherein the virtual switch does not forward the ARP broadcast to the control server if a source of the ARP broadcast is not a member of the subnet, and
wherein the virtual switch does not forward the ARP broadcast to a member virtual machine of the subnet if the source of the ARP broadcast is not a member of the subnet.

14. A computer implemented method comprising:
obtaining, at a source virtual switch, a data packet from a source virtual machine, wherein the source virtual switch and the source virtual machine are associated with a first subnet and reside on a source host, the data packet including a virtual media access control (MAC) address of a destination virtual machine residing on a destination host, the virtual machine also being communicatively coupled to another virtual switch associated with a second subnet and configured to transmit the data packet to the virtual switch conditioned on determining a destination of the data packet is not associated with the second subnet;
conditioned on determining the destination of the data packet is outside of the first subnet, rewriting, at the source virtual switch, the virtual MAC address of the destination virtual machine in the data packet to a physical MAC address of the destination host on which the destination virtual machine resides, wherein the data packet also comprises an internet protocol (IP) address of the destination virtual machine; and
providing the data packet to a physical switch on a computer network responsive to rewriting the virtual MAC address, wherein the virtual MAC address of the destination virtual machine is not available to the physical switch whereas the physical MAC address is available to the physical switch, for data packet forwarding.

15. The method of claim 14 further comprising:
obtaining the data packet at a destination virtual switch on the destination host;
matching, with the destination virtual switch, the internet protocol address of the destination virtual machine with the virtual MAC address of the destination virtual machine; and
rewriting the physical MAC address of the destination host with the destination virtual MAC address of the destination virtual machine.

* * * * *